United States Patent [19]

Hollenberg et al.

[11] Patent Number: 4,865,921

[45] Date of Patent: Sep. 12, 1989

[54] MICROWAVE INTERACTIVE LAMINATE

[75] Inventors: David H. Hollenberg, Neenah, Wis.; Leon Katz, Stamford, Conn.

[73] Assignee: James Riker Corporation of Virginia, Richmond, Va.

[21] Appl. No.: 206,961

[22] Filed: Jun. 10, 1988

Related U.S. Application Data

[63] Continuation of Ser. No. 24,063, Mar. 10, 1987, abandoned.

[51] Int. Cl.$^4$ .............................................. B32B 15/08
[52] U.S. Cl. .................................... 428/461; 426/107; 426/234; 426/243; 219/10.55 E; 428/688; 428/458; 427/256
[58] Field of Search ............... 428/461, 458, 688; 426/107, 234, 243; 427/256

[56] References Cited

U.S. PATENT DOCUMENTS

| | | | |
|---|---|---|---|
| 3,058,845 | 10/1962 | Hendricks | 427/304 |
| 3,647,508 | 3/1972 | Gorrell | 156/4 |
| 3,783,220 | 1/1974 | Tanizaki | 219/10.55 |
| 3,853,612 | 12/1974 | Spanoudis | 117/212 |
| 3,925,578 | 12/1975 | Polichette et al. | 427/304 |
| 3,965,323 | 6/1976 | Forker, Jr. et al. | 219/10.55 |
| 4,144,438 | 3/1979 | Gelman et al. | 219/10.55 |
| 4,190,757 | 2/1980 | Turpin et al. | 219/10.55 E |
| 4,204,336 | 5/1980 | Le Viet | 34/5 |
| 4,230,924 | 10/1980 | Brastad et al. | 426/107 |
| 4,258,086 | 3/1981 | Beall | 426/234 |
| 4,264,668 | 4/1981 | Balla | 428/195 |
| 4,266,108 | 5/1981 | Anderson et al. | 219/10.55 E |
| 4,268,738 | 5/1981 | Flautt et al. | 426/107 |
| 4,283,427 | 8/1981 | Winter et al. | 426/107 |
| 4,398,994 | 8/1983 | Beckett | 156/659.1 |
| 4,434,197 | 2/1984 | Petriello et al. | 427/407.1 |
| 4,518,651 | 5/1985 | Wolfe, Jr. | 428/308.8 |
| 4,552,614 | 11/1985 | Beckett | 156/629 |
| 4,553,010 | 11/1985 | Bohrer et al. | 219/10.55 EE |
| 4,594,492 | 6/1986 | Maroszek | 426/113 |
| 4,612,431 | 9/1986 | Brown et al. | 426/107 |
| 4,641,005 | 2/1987 | Seiferth | 219/10.55 E |
| 4,678,882 | 7/1987 | Bohrer et al. | 426/107 |
| 4,685,997 | 8/1987 | Beckett | 156/629 |
| 4,713,510 | 12/1987 | Quick et al. | 426/107 |

Primary Examiner—Edith Buffalow
Attorney, Agent, or Firm—Richard J. Gallagher

[57] ABSTRACT

Process for chemically modifying microwave interactive film and chemically modified microwave interactive film, chemically modified microwave interactive laminates and packages containing chemically modified microwave interactive film.

24 Claims, 2 Drawing Sheets

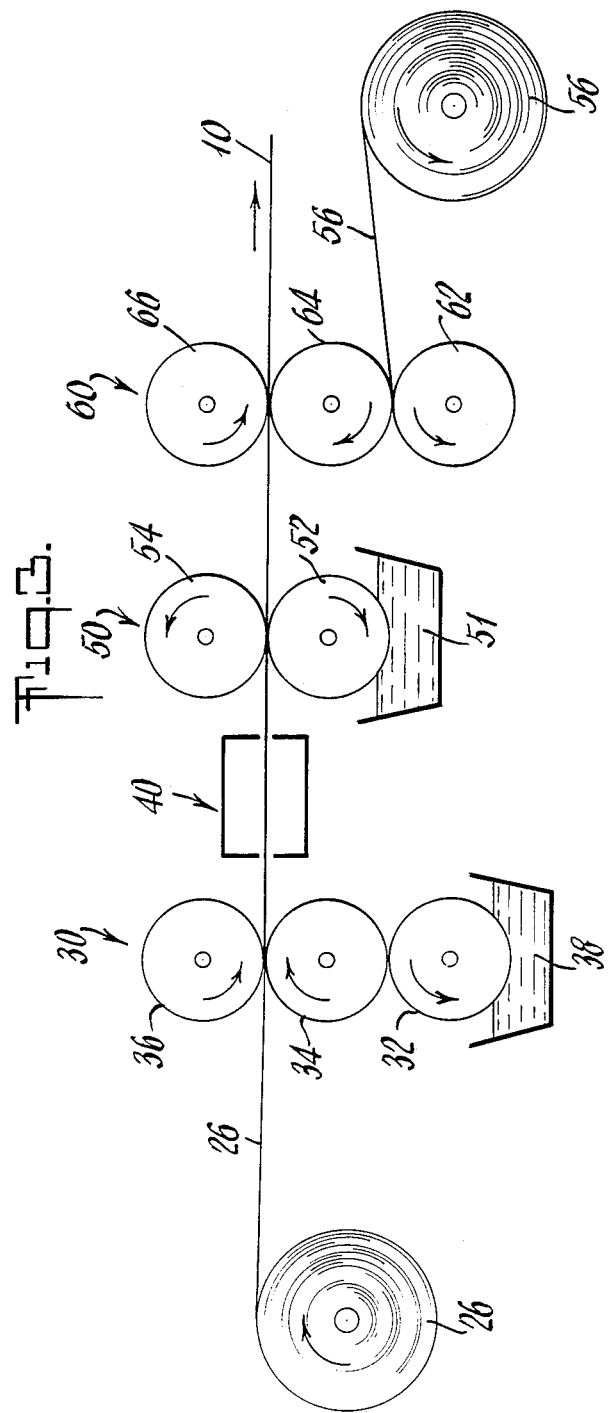

MICROWAVE INTERACTIVE LAMINATE

This is a continuation of application Ser. No. 024,063, filed Mar. 10, 1987, now abandoned.

FIELD OF THE INVENTION

The present invention relates to a process for chemically treating the microwave interactive layer of a microwave interactive laminate to reduce or eliminate the capacity of the microwave interactive layer to generate heat in response to microwave energy. The present invention also relates to chemically modified microwave interactive film and chemically modified microwave interactive laminates which include a chemically treated microwave interactive layer.

BACKGROUND OF THE INVENTION

A characteristic of microwave cooking is that the exterior of foods cooked in a microwave oven, such as breads, do not have a brown or crisp texture desired by consumers. An objective of those concerned with microwave cooking has therefore been to provide ways of browning or crisping the exterior of foods cooked in a microwave oven.

One technique developed to brown or crisp the exterior of foods during microwave cooking has been the incorporation of a microwave interactive laminate into packages which contain foods. In response to microwave energy, a microwave interactive layer of the laminate generates heat which browns or crisps the surface of food.

Typically, a microwave interactive laminate includes a thin film which has a microwave interactive layer of lossy material deposited onto one side of the film. The layer of material generates heat in response to microwave energy. Film with a microwave interactive layer deposited on one side is a microwave interactive film.

To form a microwave interactive laminate, the microwave interactive film is bonded to a substrate, which substrate serves as a support structure. The microwave interactive layer is between the film and the substrate. The laminate may subsequently be cut into a shape that approximates the shape of a particular food product or the size of a particular package.

Commercially, microwave interactive laminate can most conveniently be cut into rectangles for use in packages. When the food product which is being heated is circular, triangular or some other shape which does not conform to a rectangle, heat-generating areas of the microwave interactive laminate will not be covered by the food product. The exposed areas of conventional microwave interactive laminate can produce excessive heat which can scorch the food or the container. Also, the efficiency of the microwave interactive laminate is diminished when heat-generating areas are not covered by the food product since the exposed heat-generating areas absorb microwave radiation that would otherwise brown or crisp the food.

In addition, the heat-generating areas of a microwave interactive laminate can overlap each other when a package is assembled. Excessive heat is generated at the areas of overlap which can scorch the food or the package.

Finally, in packages where the microwave interactive laminate covers only a portion of a package or container, adhesive used to bond the microwave interactive laminate to the package or container can extend outside the area covered by the microwave interactive laminate. Adhesive outside the area of a package surface covered by the microwave interactive laminate can cause packages to stick together during production and handling.

Microwave interactive laminates formed in accordance with the present invention have a microwave interactive layer with a heating area or areas of any desired shape. Excessive heat generation caused by exposed or overlapping microwave interactive laminates can thus be avoided by the present invention.

SUMMARY OF THE INVENTION

One embodiment of the present invention is a microwave interactive film which has been treated with an inactivating chemical, comprising, (a) a film layer; and (b) a microwave interactive layer deposited onto one side of the film layer, the microwave interactive layer having a heating area and an inactivated area, wherein the capability of the inactivated area to generate heat in response to microwave energy has been reduced by the inactivating chemical.

A further embodiment of the present invention is a microwave interactive laminate, comprising, (a) a microwave interactive film having a film layer and a microwave interactive layer deposited onto one side of the film layer, the microwave interactive layer having a heating area and an inactivated area wherein the capability of the inactivated area to generate heat in response to microwave energy has been reduced by said inactivating chemical; and (b) a substrate layer bonded to the microwave interactive film to form a microwave interactive laminate, wherein the microwave interactive layer is between the film layer and the substrate layer.

A further embodiment of the present invention is a process for making a microwave interactive laminate having a substrate layer and a microwave interactive film, comprising (a) providing a microwave interactive film having a film layer and a microwave interactive layer deposited onto one side of the film layer; (b) treating a selected area of the microwave interactive layer with an inactivating chemical in an amount sufficient to convert the selected area into an inactivated area with reduced capability of generating heat in response to microwave energy; and (c) bonding the microwave interactive film treated in accordance with step (b) to the substrate layer to place the microwave interactive layer between the film layer and the substrate layer.

Additional advantages and embodiments of the invention will be set forth in part in the description which follows, and in part will be apparent from the description, or may be learned by practice of the invention. The advantages of the invention may be realized and attained by processes, materials and combinations particularly pointed out in the appended claims.

BRIEF DESCRIPTION OF THE DRAWINGS

FIG. 3 is a schematic representation of apparatus which may be used to chemically treat a microwave interactive layer in accordance with the present invention.

DETAILED DESCRIPTION OF THE INVENTION

Figure 1:
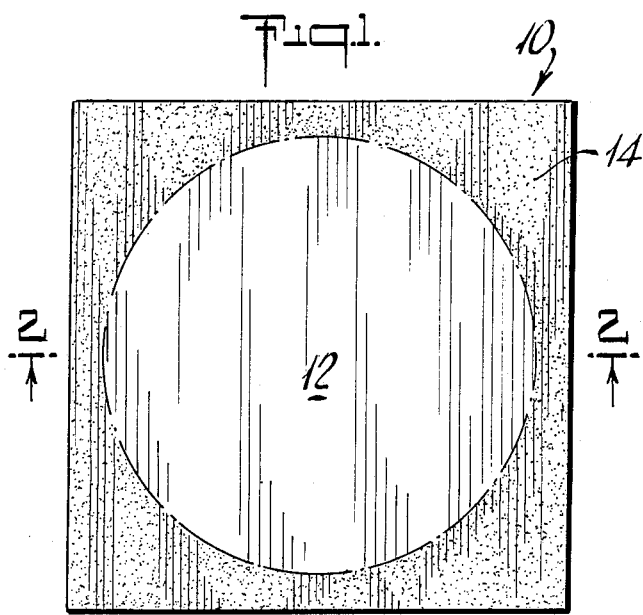
FIG. 1 is a top view of a microwave interactive laminate made in accordance with the present invention showing heating and inactivated areas.

One embodiment of the present invention, illustrated with reference to FIG. 1, is a microwave interactive laminate 10 having a heating area 12 and an inactivated area 14. An inactivating chemical has reduced or eliminated the ability of a selected area of a microwave interactive layer (not shown in FIG. 1), corresponding to inactivated area 14, to generate heat in response to microwave energy. Only heating area 12 remains fully capable of generating heat in response to microwave energy without impairment since the area of the microwave interactive layer corresponding to heating area 12 has not been treated with the inactivating chemical.

In the embodiment of the invention illustrated in FIG. 1 the heating area 12 is circular to approximate the shape of a circular food product such a pizza. The food product will cover heating area 12 when the food is placed in a package into which the microwave interactive laminate 10 has been bonded. The area of the microwave interactive layer corresponding to heating area 12 will generate heat in response to microwave energy, preferably sufficient heat to brown or crisp the surface of food product placed in or on the package.

The present invention is not limited, of course, by the location of the heating area in a package or container. The heating area of a laminate formed in accordance with the present invention could be on any surface of a package or container where heat for browning or crisping the food is desired. The heating area may therefore be at the bottom interior surface, the top interior surface, verticle interior surfaces or top exterior surface of a container, depending on where the heat for browning or crisping food is desired and the kind of container involved.

Figure 2:
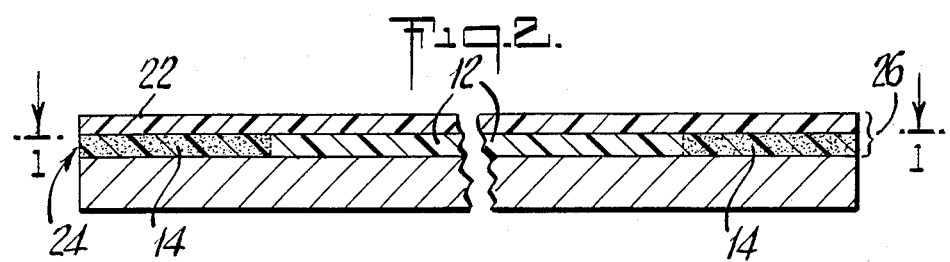
FIG. 2 is a cross sectional diagram of the microwave interactive laminate illustrated in FIG. 1 along line 1'—1'.

FIG. 2 illustrates the layers making up microwave interactive laminate 10. It will be understood, of course, that the sizes of layers illustrated in FIG. 2 are exaggerated for purposes of illustration and are not necessarily in correct proportion to each other.

Film layer 22 is a heat tolerant and heat stable material. Immediately below film layer 22 is microwave interactive layer 24 which is a thin layer of material capable of generating heat in response to microwave energy, if it is not chemically treated to reduce or eliminate its ability to generate heat in response to microwave energy. In the embodiment illustrated in FIG. 2, a selected area of the microwave interactive layer has been treated chemically to form inactivated area 14, which corresponds to the area selected for treatment. By converting the selected area into inactivated area 14 with a chemical treatment in accordance with the present invention, the shape of heating area 12 can be precisely controlled. The microwave interactive layer 24 is usually vacuum vapor deposited onto one side of film layer 22 to form microwave interactive film 26 consisting of layers 22 and 24. Other processes for depositing microwave interactive layer 24 onto film layer 22, such as sputtering or printing, may be used. As illustrated in FIG. 2, the inactivating chemical interacts with the microwave interactive layer 24 to convert the area of the microwave interactive layer selected for treatment with an inactivating chemical, into inactivated area 14 without removing microwave interactive layer 24. After the treating step, the microwave interactive film 26, is bonded to substrate layer 28 with an appropriate adhesive. Substrate layer 28 provides laminate 10 with structural rigidity and a fixed shape which conforms to the shape of a package into which the microwave interactive laminate 10 will be incorporated.

The film layer 22 serves as a stock material onto which microwave interactive layer 24 is deposited to form microwave interactive film 27 consisting of layers 22 and 24. Film layer 22 can also separate a food product resting on top of laminate 10 from the microwave interactive layer 24 or the substrate 26. The film layer 22 must be sufficiently stable at high temperatures when laminated to substrate layer 28 so that it will not degrade during the operation of a microwave oven at temperatures selected for cooking the desired food. Suitable materials for use as a film layer include, but are not limited to, films such as polyesters, polyolefins, nylon, cellophane, polysulphone, biaxially oriented polyester and other relatively stable plastics. It has been found that biaxially oriented polyester is a preferred material for most food containers because of its heat stability and its surface smoothness.

The microwave interactive layer 24 is preferably deposited onto one side of film layer 22 by a vacuum vapor deposition technique. The side of film layer 22 onto which the microwave interactive material is deposited will face away from the food product in a container. Sputtering, printing or other techniques, which are known to those skilled in the art, may also be used to deposit a layer of lossy material which interacts with microwave energy onto one side of protective film 22.

Any suitable lossy substance that will heat in a microwave oven can be used as the microwave interactive material. These materials fall primarily into four groups: conductors, semi-conductors, ferromagnetic materials and dielectic materials. Any of these materials which convert microwave radiation into heat energy may be used in the present invention. Preferred microwave interactive materials used in the present invention to form microwave interactive layer 24 are compositions containing metals or other materials such as aluminum, iron, nickel, copper, silver, carbon, stainless steel, nichrome, magnetite, zinc, tin, iron, tungsten and titanium. These materials may be used in a powder, flake or fine particle form. The microwave interactive materials can be used alone or in combination with each other. The most preferred material for many applications of the present invention is aluminum metal.

The microwave interactive layer 24 is very thin. For instance, when aluminum is the microwave interactive material, it is virtually impossible to mechanically measure the exact thickness of microwave interactive layer 24 with presently known instruments. In general, the thickness of vacuum vapor deposited layers of electrically conductive material is measured in terms of the optical density of the conductive layer itself. Microwave interactive layers used in microwave cooking are so thin that after they are deposited on transparent film, the microwave interactive film made up of film layer 22 and microwave interactive layer 24 may be seen through by the human eye.

A wide variety of chemicals may be used to reduce or eliminate the heat-generating capability of microwave interactive layer 24. It has generally been found that aqueous solutions of chelating agents, solutions of $Zr^{+4}$, amines and hydroxyamines, dilute acids and bases and solutions of metal salts are useful in reducing or eliminating the microwave interactive properties of microwave interactive layer 24. Examples of chelating agents are ethylenediaminetetracetic acid (EDTA), diethylenetriaminepentacetic acid (DTPA) and hydroxyethylenediaminetriacetic acid (HOEDTA). Solutions of $Zr^{+4}$ useful in the present invention may include ammonium zirconium carbonate, sodium zirconium lactate, ammonium zirconium lactate, and zirconium tartrate. Examples of amines and hydroxyamines useful in the present invention include ethanolamines, choline and salts thereof. Acids useful in the present invention include acetic, formic and other organic acids as well as dilute mineral acids such as hydrochloric acid, hydrofluoric acid and mixtures thereof. Examples of dilute bases useful in the present invention include potassium hydroxide, sodium hydroxide, lithium hydroxide, sodium and potassium carbonates, and sodium and potassium phosphates. Solutions of salts such as ferric chloride, sodium citrate, sodium tartrate, ferric sulphate, ferrous chloride, ferrous ammonium sulphate, ammonium fluoride, sodium fluoride, zinc chloride, zinc oxide and zinc fluoride are examples of salt solutions useful in the present invention.

In general, sodium hydroxide is the preferred material used to treat microwave interactive layer 24 in accordance with the present invention, particularly when aluminum metal is the microwave interactive material making up the microwave interactive layer 24. The pH of solutions of sodium hydroxide used to inactivate portions of the microwave interactive layer 24 preferably ranges from about 7.5 to about 13 and is more preferably maintained in the range of about 8.5 to about 11. For a commercial process, the sodium hydroxide solution used to treat an aluminum microwave interactive layer is at room temperature although the temperature may be higher or lower than normal room temperature.

It is generally also advantageous to add a small amount of surfactant to solutions of an inactivating chemical used to treat the microwave interactive layer to improve the wetting characteristics of the chemical and the subsequent reaction of the chemical with the microwave interactive layer. Examples of surfactants which may be used include CERFAK 1400 TM produced by E. F. Houghton, KATAMUL-1G TM produced by Scher Chemicals, Inc., IGEPAL-C0630 TM produced by GAF Corporation and TRITON X-100 TM produced by Rohm & Haas. A surfactant preferred for use in conjunction with sodium hydroxide is TRITON X-100 TM.

The mechanism by which chemicals modify treated portions of the microwave interactivate layer without removing the layer is not known for every possible combination of chemical and microwave interactive material. It is believed, however, that aluminum is inactivated by a variety of chemicals which oxidize aluminum metal. It is possible, however that different chemicals will inactivate the microwave interactive layer by different mechanisms. Coordination, chelation, oxidation/reduction and/or formation of salts of the microwave interactive material may contribute to or cause inactivation of aluminum and other suitable lossy materials.

The substrate layer 26 may be made of a variety of materials but is preferably formed of a low density material having a relatively high insulating capacity and a heat stability sufficient to withstand cooking temperatures in a microwave oven. Suitable substrate materials include, but are not limited to, paperboard, papers, plastics, plastic films, ceramics and a wide variety of composite materials such as fiber/polymer composites.

A preferred material for use in disposable packages for prepared foods is paperboard.

A process, illustrated with reference to FIG. 3, used to make microwave interactive laminates in accordance with the present invention, may be conducted by first providing a continuous roll of microwave interactive film 26 comprising film layer 22 and microwave interactive layer 24. As explained above, microwave interactive film 26 can be formed by depositing microwave interactive material in a layer onto one side of the film. Microwave interactive films suitable for use in the present invention are commercially available and are well known to those skilled in the art.

At treating station 30 the microwave interactive layer (not shown in FIG. 3) of the microwave interactive film 26 is treated with an inactivating chemical 38 by equipment illustrated by rollers 32, 34 and 36 which print inactivating chemical 38 onto a selected area or areas of the microwave interactive layer. Inactivating chemical 38 interacts with the microwave interactive material of the selected area and converts the selected area into an inactivated area (14 in FIG. 2). The inactivating chemical 38 reduces the capability of the selected area of the microwave interactive layer to generate heat in response to microwave energy.

Conventional printing techniques such as rotogravure, flexography and lithography may be used to treat the selected area of the microwave interactive layer with inactivating chemical 38. The printing techniques used may be conducted with equipment which is well known to those of ordinary skill in the art. Flexographic printing, however, is preferred for many applications of the present invention.

After the inactivating chemical 38 has been printed onto the microwave interactive layer, the microwave interactive film is dried at drying station 40 with any conventional drier or driers, such as hot air driers, infrared heating driers, or steam heated rolls. The microwave interactive film 26 is dried after printing with chemical 38 without washing away the inactivating chemical or the inactivated material of the microwave interactive layer.

After drying, adhesive 51 is preferably applied to the treated microwave interactive film 26 at station 50 by equipment illustrated by rollers 52, 54. The adhesive 51, however, may be applied to substrate 56 rather than, or in addition to, the treated microwave interactive film 26. A variety of adhesives may be used to bond the microwave interactive film to the substrate. Adhesives found useful in the present invention include water based acrylic emulsions and casine neoprene emulsions.

After adhesive has been applied, the treated microwave interactive film 26 can be continuously bonded to substrate 56 at station 60 by equipment illustrated by rollers 62, 64 and 66 to form microwave interactive laminate 10 of the present invention. Although the process as depicted shows in-line lamination, the invention does not preclude separate stages of treating and out-of-line lamination.

Preferably, only selected areas of the microwave interactive layer have been inactivated by inactivating chemical 38, forming a shaped heating area, such as heating area 12 illustrated in FIGS. 1 and 2. The heating area may generally conform to the shape of the food product to be placed in a package. By selecting the area or areas of the microwave interactive layer which are treated with the inactivating chemical, it is possible to control the shape of the heating area. This control over the shape of the heating area can be used to prevent overlap of heat-generating areas of laminate in assembled packages and to provide heating-generating areas of laminate that are fully covered by a food product.

The process of the present invention is further illustrated with the following example.

EXAMPLE

In this Example, a selected area of an aluminum microwave interactive layer of a microwave interactive film was treated with a solution of sodium hydroxide (NaOH). The viscosity of one gallons of a one Normal, NaOH solution was adjusted with a small quantity of neutralized ACRYSOL-A5, a polyacrylic acid solution produced by Rohm & Haas. A sufficient quantity of neutralized ACRYSOL-A5 was added to provide a viscosity of 20 seconds on a number two Shell cup. After the viscosity of the NaOH solution was adjusted, approximately 0.3 grams of TRITONEX 100 Surfactant were added per gallon of NaOH solution. Finally, isopropyl alcohol was added to the NaOH solution in an amount equivalent to about 7% by weight of the NaOH and alcohol solution. A flexographic printing press was then used to print the sodium hydroxide solution onto selected areas of the aluminum microwave interactive layer. The amount of sodium hydroxide solution printed onto the selected areas of the aluminum microwave interactive layer was controlled by a 200 quad transfer roll. The treated microwave interactive film was then heated by contacting the microwave interactive laminate with the warm surface of a central impression drum of a printing press. An adhesive was then applied to a paperboard substrate and the microwave interactive film material was laminated (bonded) onto the paperboard substrate. The microwave interactive laminate formed as described above did not generate heat in response to microwave energy in a microwave oven and did not exhibit electrical conductivity.

Because the microwave interactive layer of laminates formed in accordance with the present invention generates heat only at the area or areas selected as the heating area or areas, the microwave interactive laminate does not have to be cut to the approximate shape of the food product prior to bonding to a package. This can lower package production time. Moreover, the control provided by the present invention over the shape of the heating area can be used to provide areas of heat-generating microwave interactive laminate where it is desired for a particular end use. In addition, overlap between heat-generating microwave interactive layers, which can occur when a package or container is assembled, can be avoided by inactivating selected areas of the microwave interactive layer that will overlap when the package or container is assembled.

A variety of improved packages or containers can incorporate microwave interactive laminates made in accordance with the present invention. With the present invention, for instance, pizza packages or pizza trays may be provided with a microwave interactive laminate having all areas of the microwave interactive layer of the laminate, which are not covered by the pizza, inactivated. This focuses the heat from the microwave interactive layer where it is needed to brown and crisp the pizza crust.

Packages made with the microwave interactive layer of the microwave interactive laminate covering all of the interior vertical surfaces may have ends of the vertical surfaces which form tabs or flaps which overlap the ends of adjacent vertical surface when the package is assembled. The overlapping tabs or flaps can result in overlapping areas of the microwave interactive layer of the laminate. The overlapping areas of the microwave interactive layer generate excessive heat which can result in scorching. Other package constructions, of course, can result in overlapping layers of microwave interactive layers. In some packages, for instance, overlapping occurs at glued seams or on dust flaps. Again, excessive heat is generated at the areas of overlap. The overlap problem can be avoided with the present invention by inactivating selected areas of the microwave interactive layer of the laminate which will overlap each other when the package is assembled.

It is also sometimes desirable to provide pressed trays and plates which are not microwave interactive at the brim, sides or selected areas of the bottom of a tray or plate for performance or handling reasons. With the present invention, pressed trays and plates can be provided with a microwave interactive laminate in which inactivated areas of the microwave interactive layer correspond only to areas at which heating is not desired.

In addition, stripes of the microwave interactive layer may be inactivated to provide a grid pattern of alternating activated and inactivated areas. This grid pattern decreases the amount of heat that will be generated over the grid area as a whole.

It will be apparent to those skilled in the art that various modifications and variations can be made in the products and processes of the present invention without departing from the scope or spirit of the invention. Thus, it is intended that the present invention cover modifications and variations thereof provided they come within the scope of the appended claims and their equivalents.

What is claimed is:

1. In a microwave heater element which comprises a heat stable plastic film coated with a microwave interactive material to form a microwave interactive film, the improvement which comprises and interactivated area in said microwave interactive material wherein the capability of said inactivated area to generate heat in response to microwave energy has been reduced by treatment with an inactivating chemical selected from the group consisting of aqueous solutions of chelating agents, $Zr^{+4}$, amines and hydroxy amines, and dilute bases, dilute acids, metal salts, and mixtures thereof followed by drying.

2. A microwave interactive film as defined in claim 1 wherein said inactivated area of said microwave interactive material has been treated with an inactivating chemical in an amount sufficient to prevent said inactivated area from generating heat in response to microwave energy.

3. A microwave interactive film as defined in claim 1 wherein said microwave interactive material is selected from the group consisting of iron, nickel, copper, silver, carbon, stainless steel, nichrome, magnetite, zinc, tin, tungsten, titanium, and aluminum.

4. A microwave interactive film as defined in claim 3 wherein said inactivating chemical is selected from the group consisting of EDTA, DTPA, and HOEDTA.

5. A microwave interactive film as defined in claim 3 wherein said inactivating chemical is selected from the group consisting of ethanolamine, diethanolamine, triethanolamine, choline, and salts of the ethanolamines and choline.

6. A microwave interactive film as defined in claim 3 wherein said inactivating chemical is selected from the group consisting of potassium hydroxide, sodium hydroxide, lithium hydroxide, sodium and potassium carbonates, and sodium and potassium phosphates.

7. A microwave interactive film as defined in claim 3 wherein said inactivating chemical is selected from the group consisting of acetic, formic, hydrochloric, hydrofluoric, citric, tartaric, oxalic, and succinic acids and salts thereof.

8. A microwave interactive film as defined in claim 3 wherein said inactivating chemical is selected from the group consisting of ferric chloride, ferric sulphate, ferrous chloride, ferrous ammonium sulphate, ammonium fluoride, sodium fluoride, zinc chloride, and zinc oxide.

9. A microwave interactive film as defined in claim 1 wherein the microwave interactive material is aluminum.

10. A microwave interactive film as defined in claim 9 wherein the inactivating chemical is a base.

11. A microwave interactive film as defined in claim 9 wherein the activating chemical is an alkali metal hydroxide.

12. A microwave interactive laminate which has been treated with an inactivating chemical, comprising:
a microwave interactive film layer which comprises a heat stable plastic film coated with a microwave interactive material having an inactivated area wherein the capability of said inactivated area to generate heat in response to microwave energy has been reduced by treatment with an inactivating chemical selected from the group consisting of aqueous solutions of chelating agents, $Zr^{+4}$, amines and hydroxy amines, and dilute bases, dilute acids, metal salts, and mixtures thereof followed by drying, and
a substrate layer bonded to said microwave interactive film layer to form a microwave interactive laminate, wherein said microwave interactive material is disposed between said heat stable plastic film layer and said substrate layer.

13. A microwave interactive laminate as defined in claim 12 wherein said inactivated area of said microwave interactive material has been treated with an inactivating chemical in an amount sufficient to prevent said inactivated area from generating heat in response to microwave energy.

14. A microwave interactive film as defined in claim 13 wherein said microwave interactive material is selected from the group consisting of iron, nickel, copper, silver, carbon, stainless steel, nichrome, magnetite, zinc, tin, tungsten, titanium, and aluminum.

15. A microwave interactive film as defined in claim 14, wherein said inactivating chemical is selected from the group consisting of EDTA, DTPA, and HOEDTA.

16. A microwave interactive film as defined in claim 14 wherein said inactivating chemical is selected from the group consisting of ethanolamine, diethanolamine, triethanolamine, choline, and salts of the ethanolamines and choline.

17. A microwave interactive film as defined in claim 14 wherein said inactivating chemical is selected from the group consisting of potassium hydroxide, sodium hydroxide, lithium hydroxide, sodium and potassium carbonates, and sodium and potassium phosphates.

18. A microwave interactive film as defined in claim 14 wherein said inactivating chemical is selected from the group consisting of acetic, formic, hydrochloric, hydrofluoric, citric, tartaric, oxalic, and succinic acids and salts thereof.

19. A microwave interactive film as defined in claim 14 wherein said inactivation chemical is selected from the group consisting of ferric chloride, ferric sulphate, ferrous chloride, ferrous ammonium sulphate, ammonium fluoride, sodium fluoride, zinc chloride, and zinc oxide.

20. A microwave interactive laminate as defined in claim 12 wherein said substrate is selected from the group consisting of paperboard, paper, and fiber/polymer composites.

21. A microwave interactive laminate as defined in claim 12 wherein the microwave interactive material is aluminum.

22. A microwave interactive laminate as defined in claim 21 wherein the inactivating chemical is a base.

23. A microwave interactive laminate as defined in claim 21 wherein the inactivating chemical is an alkali metal hydroxide.

24. A microwave laminate as defined in claim 12 wherein said substrate layer is bonded to said microwave interactive film with an adhesive selected from the group consisting of water-based acrylic emulsions, casein emulsions and neoprene emulsions.

* * * * *

UNITED STATES PATENT AND TRADEMARK OFFICE
CERTIFICATE OF CORRECTION

PATENT NO.  : 4,865,921
DATED       : September 12, 1989
INVENTOR(S) : Hollenberg et al.

It is certified that error appears in the above—identified patent and that said Letters Patent is hereby corrected as shown below:

On the cover page, in item 73, the correct name of the Assignee is -- James River Corporation of Virginia -- .

In column 2, line 65, "of apparatus" should read -- of an apparatus--. In column 3, line 18, "such a pizza" should read -- such as pizza --.

In column 3, line 25, "of food" should read -- of a food -- .

In column 6, line 51, "casine" should be spelled -- casein --.

In column 7, line 12, "gallons" should be -- gallon -- .

In column 7, lines 37-38 should read -- in the inactivated areas in response to microwave energy in a microwave oven and did not exhibit electrical conductivity in those same inactivated areas -- .

UNITED STATES PATENT AND TRADEMARK OFFICE
CERTIFICATE OF CORRECTION

PATENT NO. : 4,865,921
DATED : September 12, 1989
INVENTOR(S) : Hollenberg et al It is certified that error appears in the above-identified patent and that said Letters Patent is hereby corrected as shown below:

In claim 1, the fourth line should be --the improvement which comprises an inactivated --.

Signed and Sealed this

Twenty-third Day of October, 1990

Attest:

HARRY F. MANBECK, JR.

*Attesting Officer*      *Commissioner of Patents and Trademarks*